Aug. 12, 1941.      M. E. RICE      2,252,206
UNIVERSAL ANKLE JOINT
Filed June 10, 1940

Inventor
Milo E. Rice.
By Thorpe & Thorpe
Attorneys

Patented Aug. 12, 1941

2,252,206

UNITED STATES PATENT OFFICE 2,252,206

UNIVERSAL ANKLE JOINT

Milo E. Rice, Kansas City, Mo.

Application June 19, 1940, Serial No. 339,701

2 Claims. (Cl. 287—1)

This invention relates to artificial body members and more especially to ankle joints of that type in which the ankle joint permits of rocking movement in the direction of travel of the wearer as well as of a limited degree of lateral rocking movement to permit the foot to accommodate itself to a plane inclined transversely of the line of travel of the wearer of the leg.

Another object of the invention is to produce a construction of this character in which both rocking members are provided with extended, equal bearing members of strong and sturdy construction to lessen cost of manufacture and make the bearings interchangeable.

A further object of the invention is to produce a double rocking joint member which may be completely assembled at the point of manufacture, thus obviating injury or damage to bearing surfaces when the joints are assembled during the construction of an artificial leg; and which is adaptable for use with cordless as well as with cord legs.

With the general objects named in view and others as will hereinafter appear, the invention consists in certain novel and useful features of construction and organization of parts as hereinafter described and claimed; and in order that it may be fully understood, reference is to be had to the accompanying drawing, in which:

Figure 1:
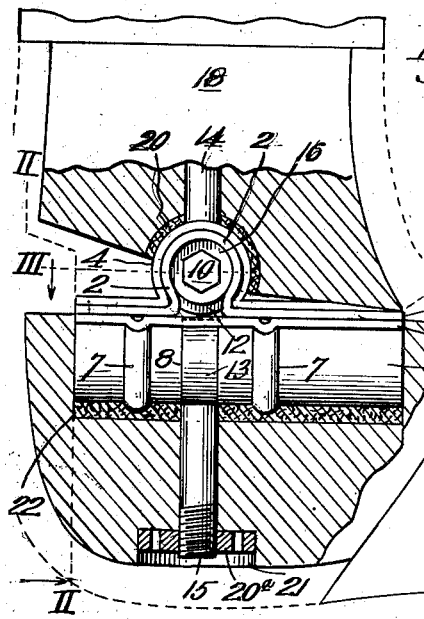
Figure 1 is a fragmentary broken view of an artificial leg equipped with an ankle joint mechanism embodying the invention, the said mechanism appearing in side view with certain parts indicated in dotted lines.
Figure 2:
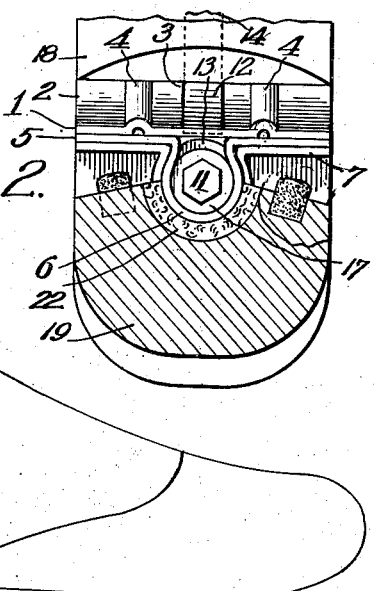
Figure 2 is a section on the line II—II of Figure 1.
Figure 3:
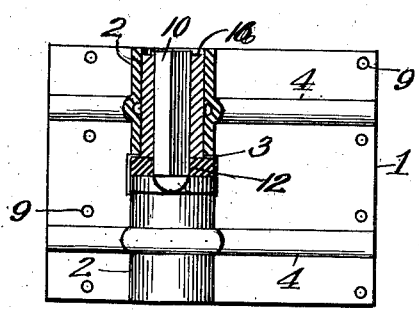
Figure 3 is a view partly in plan and partly in horizontal section on the line III—III of Figure 1, but omitting the leg and foot features.
Figure 5:
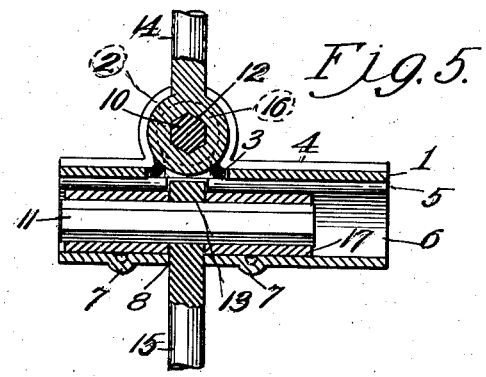
Figure 5 is a central vertical longitudinal section of the ankle joint mechanism.
Figure 4:
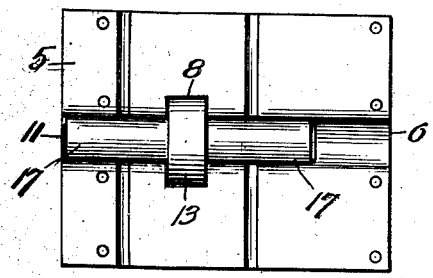
Figure 4 is a top plan view of the lower member of the ankle joint.

In the said drawing, where like reference characters identify corresponding parts in all of the figures, 1 is a metal plate which, by preference, is somewhat longer than it is wide, and pressed transversely of said plate is a loop portion 2 provided with a centered transverse slot 3. A pair of ribs 4 spaced equal distances from and parallel to the loop, are also pressed out of said plate. For cooperative association with the first plate 1, is a second plate 5, which is of somewhat greater width than length, said plate 5 being also formed with a loop 6 and parallel ribs 7, similar to those of the plate 1. The loop 6 of the plate 5 is also provided with a transverse slot 8. The two plates 1 and 5 are of equal area and are adapted to be permanently secured together by rivets 9 in flatwise abutting relation with their respective loops 2 and 6 and ribs 4 and 7, in right angular relation, the slots 3 and 8 having their vertical axes in alinement.

Figures 6, 7:
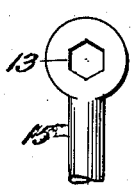
Figure 6 is a detail view of a securing eye bolt common to both members of the ankle joint, and adapted to non-rotatively receive an angular locking pin.
Figure 7 is a detail view of a metal bushing common to both members of the ankle joint, the figure indicating how the interior surface of the cylindrical bushing is indented by the corners of the angular locking pin upon the pressure seating of the bushing on said pin.

Prior to the assembly of the plates 1 and 5 as a unitary structure, each of the loops 2 and 6 are fitted with identical bearing bolt assemblies constructed substantially as follows: Positioned within each of the loops 2 and 6, are locking pins 10 and 11, of non-circular cross section, each of said pins passing through the eyes or bores 12 and 13 of the heads of securing bolts 14 and 15. The pins 10 and 11 and bolts 14 and 15 form T-shaped members with the heads of the bolts fitting respectively in the slots 3 and 8 of the plate loops and of the same diameter as the latter, and the bolt stems projecting in opposite directions. After the T-shaped members are positioned within the loops, the joints are completed by pressing into position permanent bearing members or bushings 16 and 17 of brass or other relatively ductile but wear resisting material, the construction being such that said bushings 16 and 17, in the pressing operation, are slightly grooved by the edges of the pins 10 and 11 (see Figure 7) to insure permanency of the bushings and their non-rotative interlocking with the pins, thus providing extensive bearing surfaces between the wall of the loops 2 and 6 and the external surfaces of the bushings 16 and 17.

The artificial leg members to be connected by the unitary bearings of the invention, comprise a leg member 18 and a foot member 19. The leg member is provided with a leather lined seat 20 to receive the outer or loop portion of the plate 1, said seat being grooved or indented to accommodate the ribs 4 on said plate 1 and loop 2 to prevent endwise relative movement of the parts and strain on the eye bolt. The stem of the eye bolt 14 passes upwardly into the leg where it is secured by a nut (not shown) so that the loop 2 may be drawn against its seat 20. In like manner the stem of the other eye bolt 15 passes through the foot member and it is equipped with a locking nut 20a seated in a socket 21 in the foot for drawing the loop 6 tightly down on its seat 22 of leather or the like mounted in a recess in the upper surface of the foot member.

From the above description it will be apparent that I have described and illustrated a construction embodying all of the features of advantage set forth as desirable; and while I have shown the preferred construction it is to be understood that I reserve the right to all changes within the spirit of the invention and scope of the appended claims.

I claim:

1. In an artificial ankle joint, a pair of plates secured permanently in flatwise abutting relation, and having loop portions projecting in opposite directions at right angles to each other, the loops being constricted to provide mouths of less width than the internal diameters of the loops, the latter also having cross slots in right angular relation, bolts having heads fitting in the slots of said loops respectively and stems alined and projecting in opposite directions, locking pins of angular cross section extending non-rotatably through the heads of said bolts, and cylindrical bushings of ductile metal pressed on said locking pins and embedded by the corners thereof, the bushings providing bearing surfaces between the pins and the plate loops.

2. In an ankle joint for artificial limbs, a pair of plates secured flatly together and provided with oppositely projecting loops intermediate their length standing at right angles to each other, the loops being constricted at their adjacent sides to form mouths extending at right angles to each other and also being provided diametrically opposite said mouths with slots disposed crosswise of the respective mouths, bolts extending through said slots with their heads of cylindrical form and rotatable in the slots of their respective loops and provided with axial bores of angular contour, corresponding angular locking pins fitting nonrotatably in the said bores, and a pair of cylindrical bushings journaled on and within each loop at opposite sides of and against the headed ends of said bolts, the bushings being of ductile metal pressed upon the locking pins and embedded by the angular corners thereof to turn with the said pins relative to the loops.

MILO E. RICE.